C. A. BEHLEN.
AUTO TRAILER.
APPLICATION FILED SEPT. 19, 1916.
1,227,872.
Patented May 29, 1917.
3 SHEETS—SHEET 1.
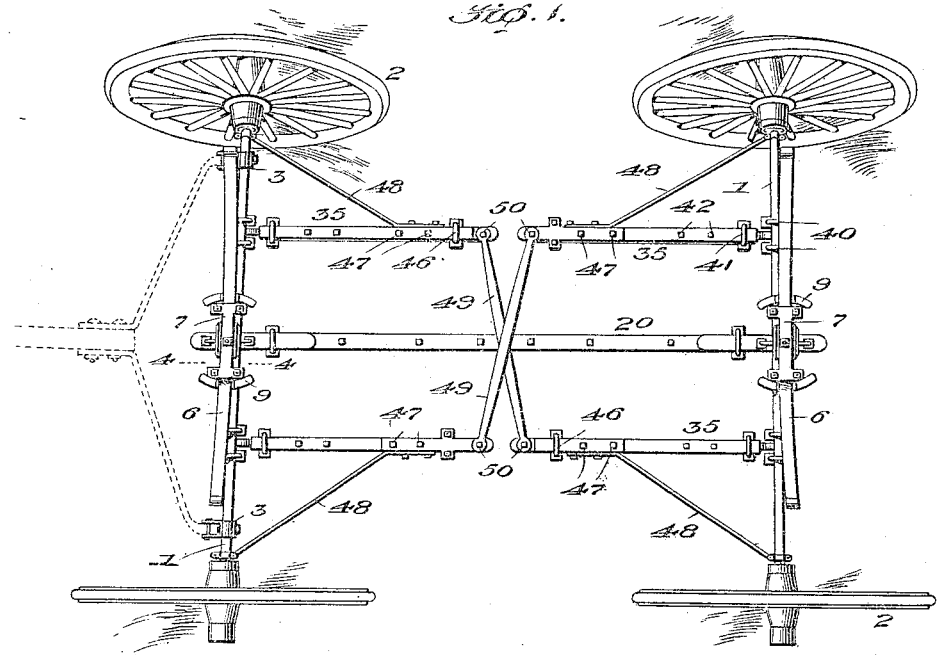
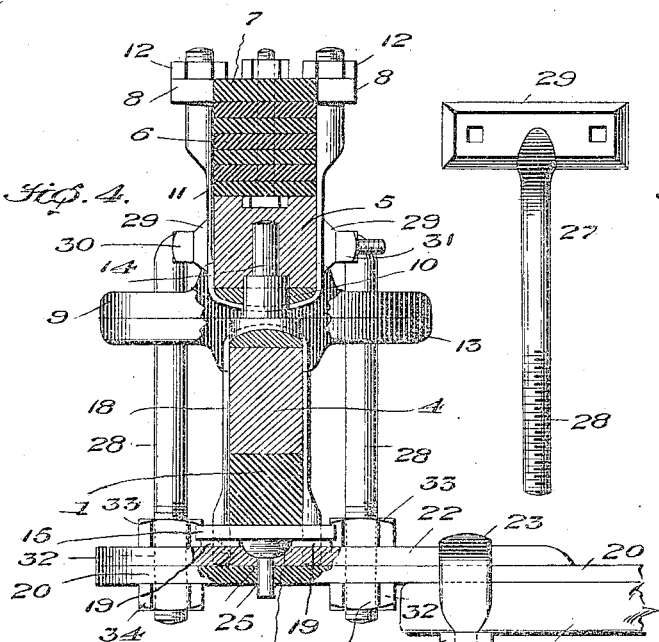
Witness
Inventor
Charles A. Behlen
by J. E. Stebbins
Attorney C. A. BEHLEN.
AUTO TRAILER.
APPLICATION FILED SEPT. 19, 1916.
1,227,872.
Patented May 29, 1917.
3 SHEETS—SHEET 2.
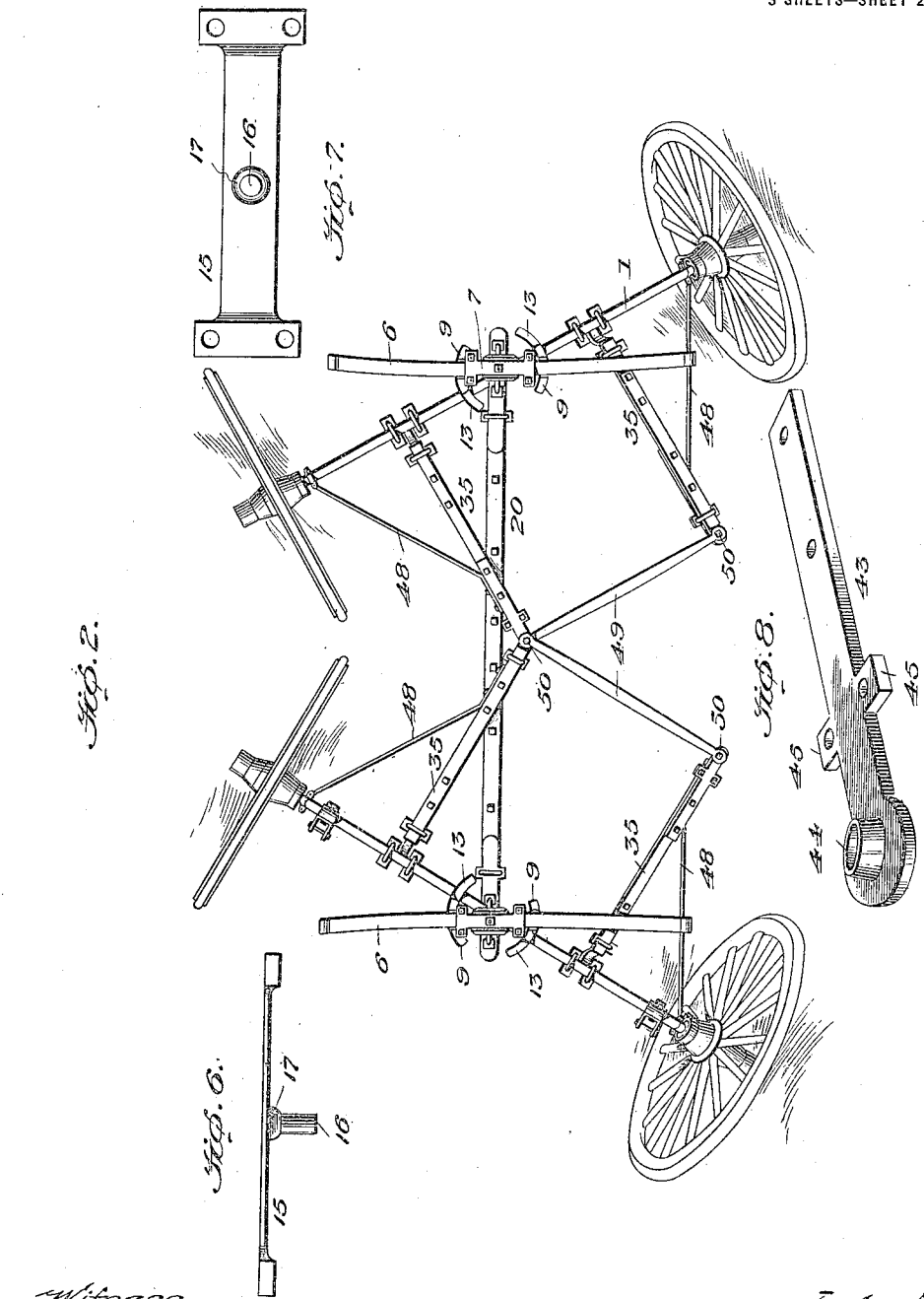
Witness
Inventor
Charles A. Behlen
by J. E. Stebbins,
Attorney.

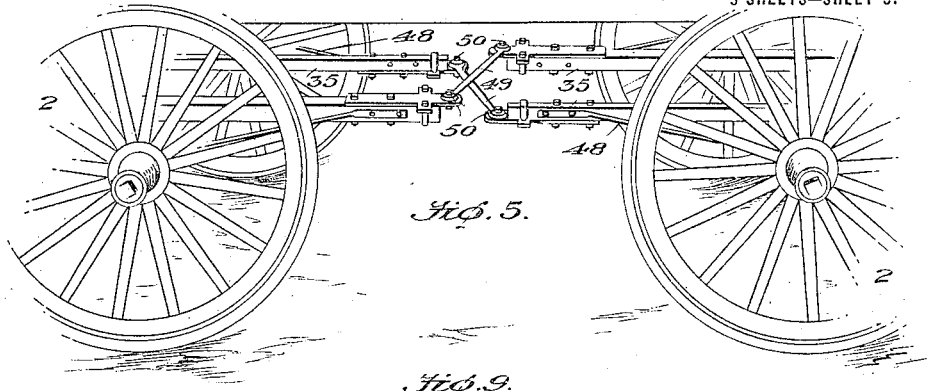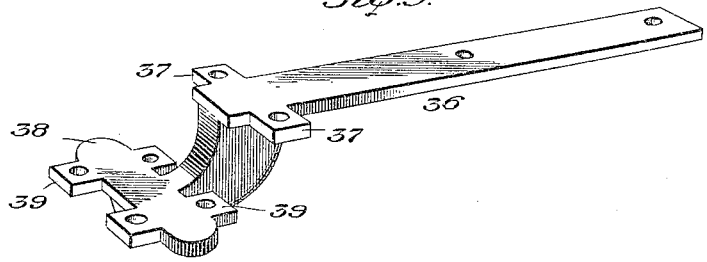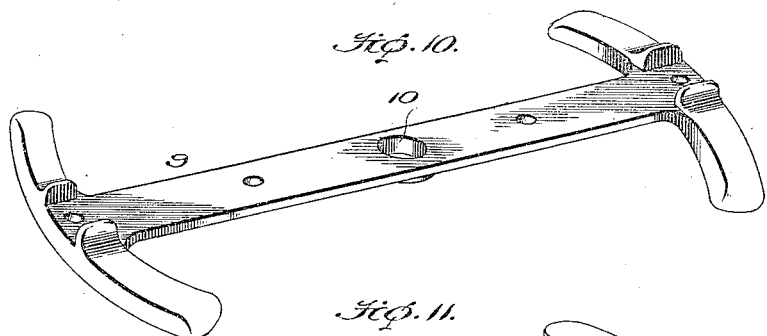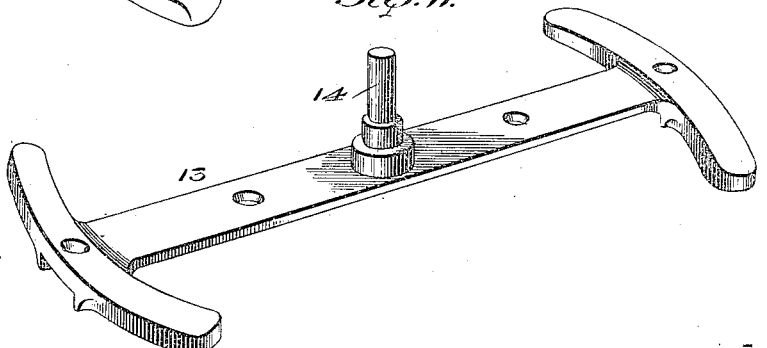

UNITED STATES PATENT OFFICE.

CHARLES A. BEHLEN, OF RICHMOND, VIRGINIA.

AUTO-TRAILER.

1,227,872. Specification of Letters Patent. Patented May 29, 1917.

Continuation of application Serial No. 73,126, filed January 20, 1916. This application filed September 19, 1916. Serial No. 120,981.

*To all whom it may concern:*

Be it known that I, CHARLES A. BEHLEN, a citizen of the United States, residing at Richmond, in the county of Henrico and State of Virginia, have invented certain new and useful Improvements in Auto-Trailers, of which the following is a specification, the present application being a continuation of my application filed January 20, 1916, Serial No. 73,126.

The invention relates to auto-trailers, or trail mobiles, which are especially designed and adapted to be attached to an automobile and hauled thereby to carry a load of any character.

When such a vehicle is drawn at high speed it is essential that the steering mechanism shall operate quickly, easily and with certainty and without jerks so as to prevent accidents and insure perfect trackage behind the power vehicle; and to attain these ends it is desirable that the steering shall be effected through the medium of the drawbar and positively operate all the wheels.

My invention consists in the construction of the chassis and the steering mechanism of an auto trailer, combined with the axles, wheels and drawbar thereof, in such a way that both the forward and rear pairs of wheels shall be operated simultaneously and in a positive manner by the horizontal movements of the drawbar.

It further consists in certain novelties of construction and combinations of parts as herein set forth and claimed.

The accompanying drawings illustrate an example of the embodiment of the invention constructed and combined according to the best method of procedure I have so far devised for the purpose.

Figure 1 is a top plan view of the running gear of a vehicle, including the springs with my invention embodied, the body being removed from the springs.

Fig. 2 is a top plan view showing the relative positions of the parts when the vehicle is rounding a curve.

Fig. 3 is a perspective view showing the lever arms and cross rods.

Fig. 4 is an enlarged section on line 4—4 of Fig. 1.

Fig. 5 is a view of one of the two connecting irons.

Figs. 6 and 7 are side and top plan views of the lower king bolt and plate.

Fig. 8 is a perspective view of one of the four lever arm plates.

Fig. 9 is a perspective view of one of the four heel couplings.

Fig. 10 is a perspective view of an upper fifth wheel member.

Fig. 11 is a perspective view of the lower fifth wheel member and upper king bolt.

As both ends of the running gear are of the same construction, the description of one will in general apply to the other end.

Referring to the figures, 1 designates the axles provided with journals upon which the wheels 2 are mounted so as to rotate in the well known way; 3, the couplings on the front axle to which the drawbar, shown in dotted lines, is connected; 4, the axle bed; 5, the head block; 6, the semi-elliptic spring mounted upon the head block; 7, the spring cap plates having perforated lugs 8, as shown; 9, the upper fifth wheel member having a hole 10 at the center; 11, the threaded U-shaped clips which pass around the upper fifth wheel member, head block and spring with the ends within the perforations of the cap plate and secured by nuts 12, as shown; 13, the lower fifth wheel member having the upper king bolt 14 which is passed through the hole 10 and extended into the head block; 15, the lower king bolt plate having perforated lugs at the ends; 16, the lower king bolt; 17, a bearing boss; 18, threaded U-shaped clips which pass around the lower fifth wheel member, the axle bed and axle and have their ends seated within the holes in the lugs of the plate 15 and secured by nuts 19 in a well known way; 20, the reach comprised of a metallic perforated bar reinforced by a wooden strip 21, as shown by Fig. 4; 22, a reinforcing plate secured to the reach by a threaded clip 23 and yoke 24 perforated to receive the ends of the clip to which nuts are applied; 25, a hole in the reach and reinforcing plate to receive the lower king bolt; 26, a recess in the plate to receive the boss 17 of the lower king bolt; 27, two coupling or connecting irons each having a threaded bolt part 28 and a perforated plate 29 at the opposite end; 30, two bolts passed through the holes in the plates and through the head block and secured by nuts 31, see Fig. 4; 32, holes through the end of the reach and reinforcing plate within which the bolt parts 28 are seated and secured by top jam nuts 33 and lower jam nuts 34, which provides for the adjustment of the reach and relatively to the axle to take up wear of the fifth wheel members and other parts; 35, lever arms; 36, heel plates having perforated lugs 37 and an integral yoke 38 offset to lie in a plane below the plate proper; 39, the perforated lugs of the yoke; 40, two threaded clips which pass around the axle and axle bed and through the holes in the yoke, where they are secured by nuts; 41, a clip with threaded ends which secures a plate to the end of the lever arm; 42, bolts passed through the plate and lever arms to reinforce the connection; 43, a lever arm plate with a perforated boss 44 and perforated lugs 45 at the sides; 46, a threaded clip which secures the lever arm plate to the free end of a lever arm; and 47 are bolts passed through the plate and free end of the arm.

Each lever arm is connected with the axle by a diagonal brace 48, as shown.

On reference to Fig. 3 it will be seen that adjacent front and rear lever arms have the plates applied one to the top surface of an arm and the other to the lower surface so the plates will lie in parallel planes. The cross rods or bars 49 having perforations at the ends secured to the ends of the plates by bolts 50 will thus be in parallel planes and can move when the axles are turned without frictional contact or interference each with the other.

Special characteristics of construction are the heel pieces which allow the lever arms to be located in a plane above the plane of the reach; the lever arm plates and their locations relatively to the ends of the arms; the reinforcing of the ends of the reach; and the combination of the fifth wheel members, king bolts and head block through the medium of the coupling or connecting irons one at each side of the axle and head block, this latter arrangement being important, as the single reach transmits motion to the rear part of the running gear.

The mode of operation is as follows: When the front axle and wheels are turned by a side movement of the drawbar the lower member of the front fifth wheel and the two lever arms are moved through the arc of a circle, and through the medium of the crossbars motion is transmitted to the rear lever arms, rear axle and rear lower member of the fifth wheel, but the movement is in the opposite direction, due to the bars being crossed, the relative positions of the several parts, front and rear, being shown by Fig. 2.

From the foregoing description taken in connection with the drawings it becomes clear that I have provided a trailer having means for turning the rear axle and wheels simultaneously with the turning of the front axle and wheels, which is of a very simple construction and efficient in operation.

It will be noted that the ends of the reach are rigidly secured to the head blocks so that the reach, head blocks, springs and body on the springs will retain their relative positions at all times, and that the axles are pivoted between the ends of the reach and the head blocks so they can turn in opposite directions, and that the strains in drawing are transmitted to the rear axle through the medium of the reach under all conditions.

What I claim is:

1. The combination in an auto trailer, of two axles with wheels thereon, two head blocks, two frictional bearing members between each axle and a head block, a reach with its ends extended beneath the axles and each end of the reach rigidly secured to a head block, whereby each axle can turn relatively to a head block and the reach; two lever arms secured to each axle by clips; braces connecting each lever arm with an axle; and crossbars disposed in different parallel planes above the reach and pivoted at their ends to the free ends of the lever arms.

2. The combination in a trailer, of two head blocks, a reach, two axles with wheels, each axle being pivoted between a head block and an end of the reach, two pairs of lever arms one pair secured to each axle and extended so the free ends of opposite pairs are adjacent each other; and two rigid crossbars pivotally uniting the lever arms; the adjacent lever arms of opposite pairs being provided with plates disposed in different planes whereby the bars are located in different planes so they can move freely each relatively to the other.

3. The combination in an auto trailer, of two head blocks; a reach rigidly uniting the head blocks; two axles, each pivoted between an end of the reach and a head block; two lever arms secured to each axle through the medium of offset heel irons and clips and braces whereby the said arms will lie in a plane above the reach; and crossbars in different planes uniting the lever arms.

4. The combination in an auto trailer and with the axles, of a reach uniting the axles; and lever arms secured to the axles by heel plates, each heel plate comprising a plate proper and an offset yoke with holes for clips, said yoke being in a plane parallel with the plate, whereby the lever arms may be disposed in a plane above the reach.

5. The combination in an auto trailer and with the axles, of a reach; pairs of lever arms secured to opposite axles, the free ends of the arms being provided with perforated plates secured to the top and bottom surfaces of the arms so as to lie in different parallel planes; and crossbars pivoted to the plates.

6. The combination in an auto trailer, of axles, a reach, head blocks, pairs of lever arms secured to the axles, cross rods uniting the arms, two upper pairs of fifth wheel and lower fifth wheel members each pair having an upper king bolt, lower plates 15 each with a lower king bolt seated within an opening at the end of the reach, and connecting irons rigidly uniting each end of the reach with a head block, whereby each axle can rotate between an end of the reach and a head block.

7. The combination in an auto trailer, of two pairs of wheels and axles, a reach extending between the axles and opposite ends thereof pivoted to the respective axles, spaced pairs of lever arms rigidly secured to opposite axles in a plane above the plane of the reach and the free ends of the pairs located adjacent to each other, and rigid crossbars in different parallel planes pivotally uniting the lever arms; whereby in turning the lever arms may pass over the reach and a thrust and pulling force may be transmitted from one pair of lever arms to the other pair.

In testimony whereof I affix my signature.

CHARLES A. BEHLEN.

Copies of this patent may be obtained for five cents each, by addressing the "Commissioner of Patents, Washington, D. C."